United States Patent
Nam et al.

(10) Patent No.: US 10,448,015 B2
(45) Date of Patent: Oct. 15, 2019

(54) METHOD AND DEVICE FOR PERFORMING ADAPTIVE FILTERING ACCORDING TO BLOCK BOUNDARY

(71) Applicant: LG Electronics Inc., Seoul (KR)

(72) Inventors: Junghak Nam, Seoul (KR); Chulkeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/736,238

(22) PCT Filed: Jun. 16, 2016

(86) PCT No.: PCT/KR2016/006405
§ 371 (c)(1),
(2) Date: Dec. 13, 2017

(87) PCT Pub. No.: WO2016/204531
PCT Pub. Date: Dec. 22, 2016

(65) Prior Publication Data
US 2018/0199034 A1 Jul. 12, 2018

Related U.S. Application Data

(60) Provisional application No. 62/180,069, filed on Jun. 16, 2015.

(51) Int. Cl.
| | | |
|---|---|---|
| *H04N 19/117* | (2014.01) | |
| *H04N 19/176* | (2014.01) | |
| *H04N 19/124* | (2014.01) | |
| *H04N 19/182* | (2014.01) | |
| *H04N 19/513* | (2014.01) | |

(Continued)

(52) U.S. Cl.
CPC ......... *H04N 19/117* (2014.11); *H04N 19/124* (2014.11); *H04N 19/176* (2014.11); *H04N 19/182* (2014.11); *H04N 19/513* (2014.11); *H04N 19/82* (2014.11); *H04N 19/96* (2014.11)

(58) Field of Classification Search
CPC .. H04N 19/117; H04N 19/124; H04N 19/176; H04N 19/182; H04N 19/513; H04N 19/82; H04N 19/96; H04N 19/50; G06T 3/40
See application file for complete search history.

(56) References Cited

U.S. PATENT DOCUMENTS

| | | | | |
|---|---|---|---|---|
| 2013/0156346 | A1* | 6/2013 | Lee | G06T 3/4007 382/300 |
| 2014/0205011 | A1* | 7/2014 | Sung | H04N 19/597 375/240.12 |
| 2014/0355695 | A1* | 12/2014 | Lim | H04N 19/82 375/240.29 |

FOREIGN PATENT DOCUMENTS

| | | |
|---|---|---|
| KR | 10-2012-0010177 A | 2/2012 |
| KR | 10-2014-0019221 A | 2/2014 |

(Continued)

*Primary Examiner* — Tracy Y. Li
(74) *Attorney, Agent, or Firm* — Dentons US LLP

(57) ABSTRACT

The present invention relates to a method for performing adaptive filtering according to a block boundary, comprising the steps of: determining whether a current pixel is within a block boundary; determining the shape of a filter depending on the location of the current pixel, when the current pixel is within the block boundary; calculating a filter coefficient based on the shape of the filter; and performing an adaptive loop filtering using the filter coefficient.

11 Claims, 12 Drawing Sheets

(51) Int. Cl.
*H04N 19/82* (2014.01)
*H04N 19/96* (2014.01)

(56) References Cited

FOREIGN PATENT DOCUMENTS

| | | |
|---|---|---|
| KR | 10-2014-0056342 A | 5/2014 |
| KR | 10-2014-0085541 A | 7/2014 |
| KR | 10-2014-0094496 A | 7/2014 |

* cited by examiner

【Figure 1】
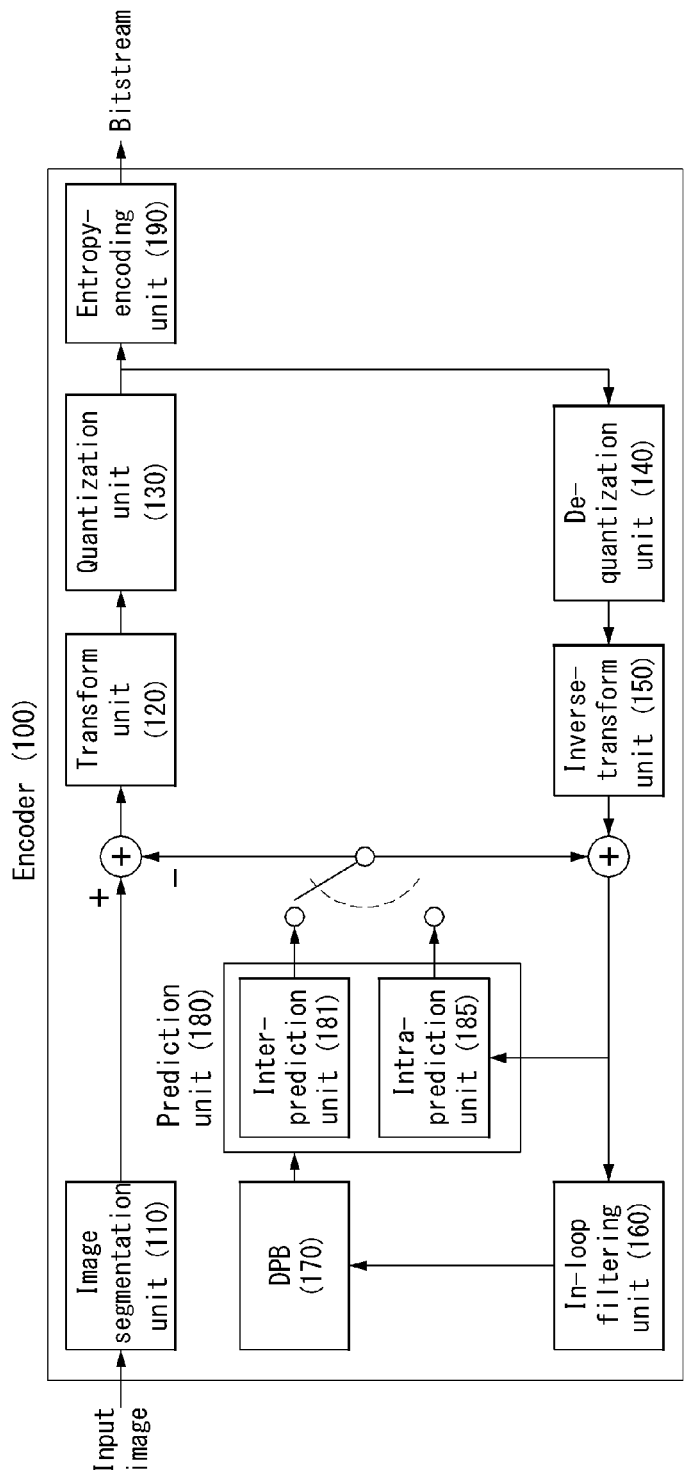

【Figure 2】
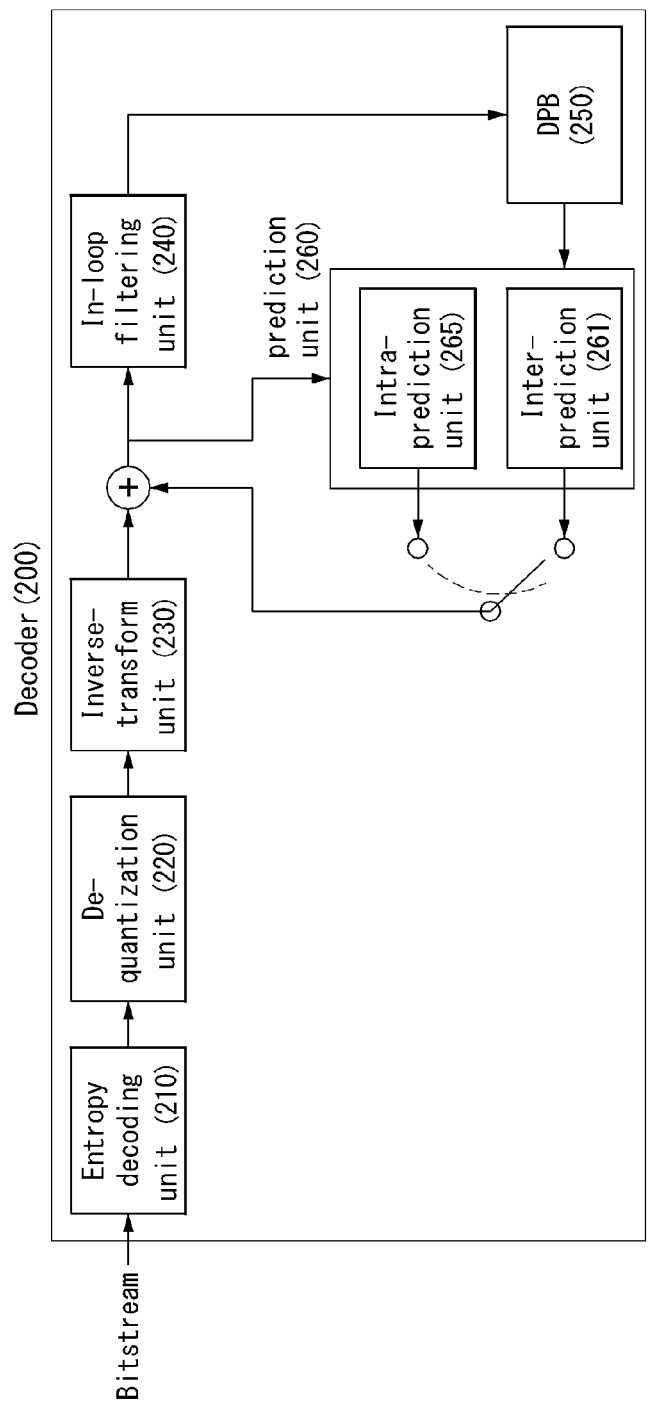

[Figure 3]
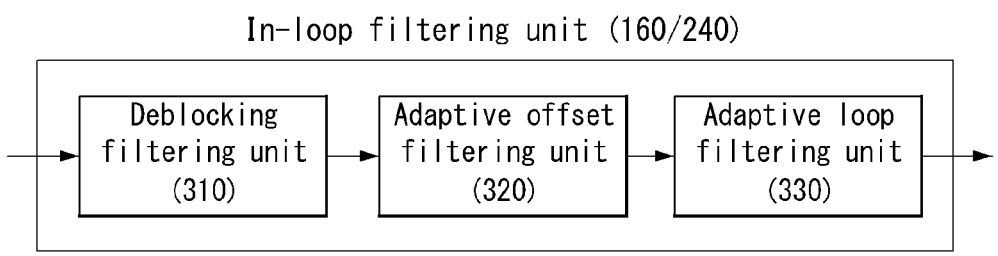

【Figure 4】
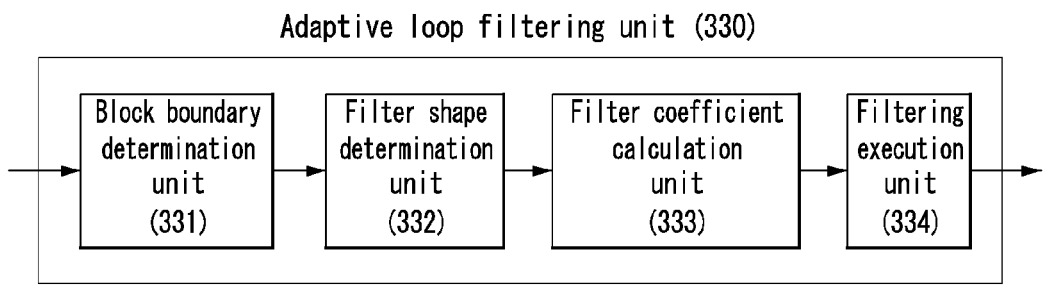

[Figure 5]
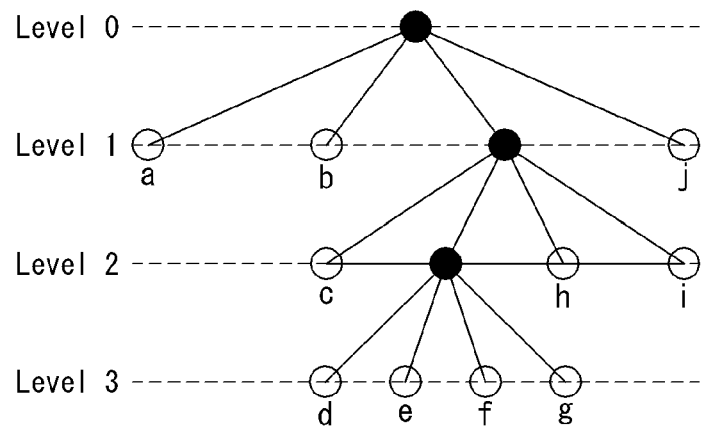
(a)
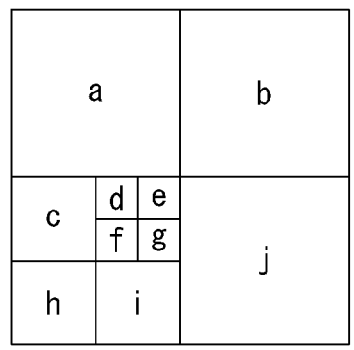
(b)

【Figure 6】

| A ALF on | B ALF off | C ALF on | D ALF off |
|---|---|---|---|
| E ALF off | F ALF off | G ALF on | H ALF on |
| I ALF on | J ALF on | K ALF off | L ALF on |

【Figure 7】
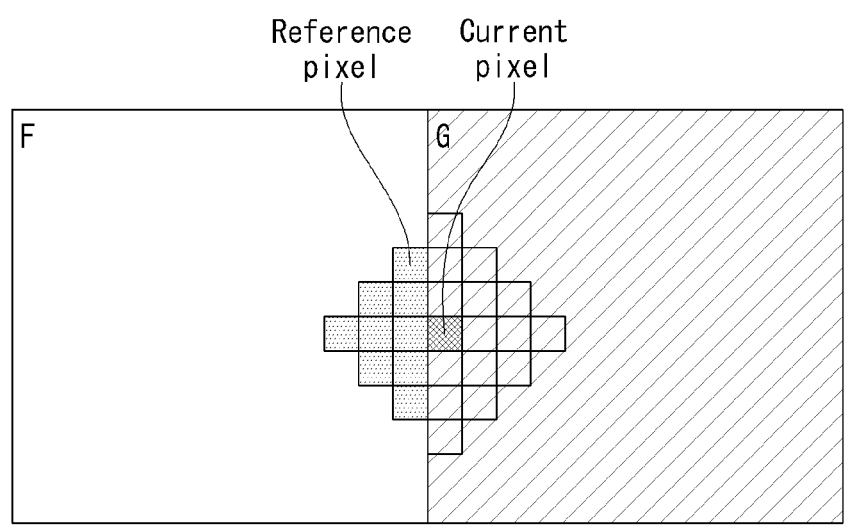

[Figure 8]
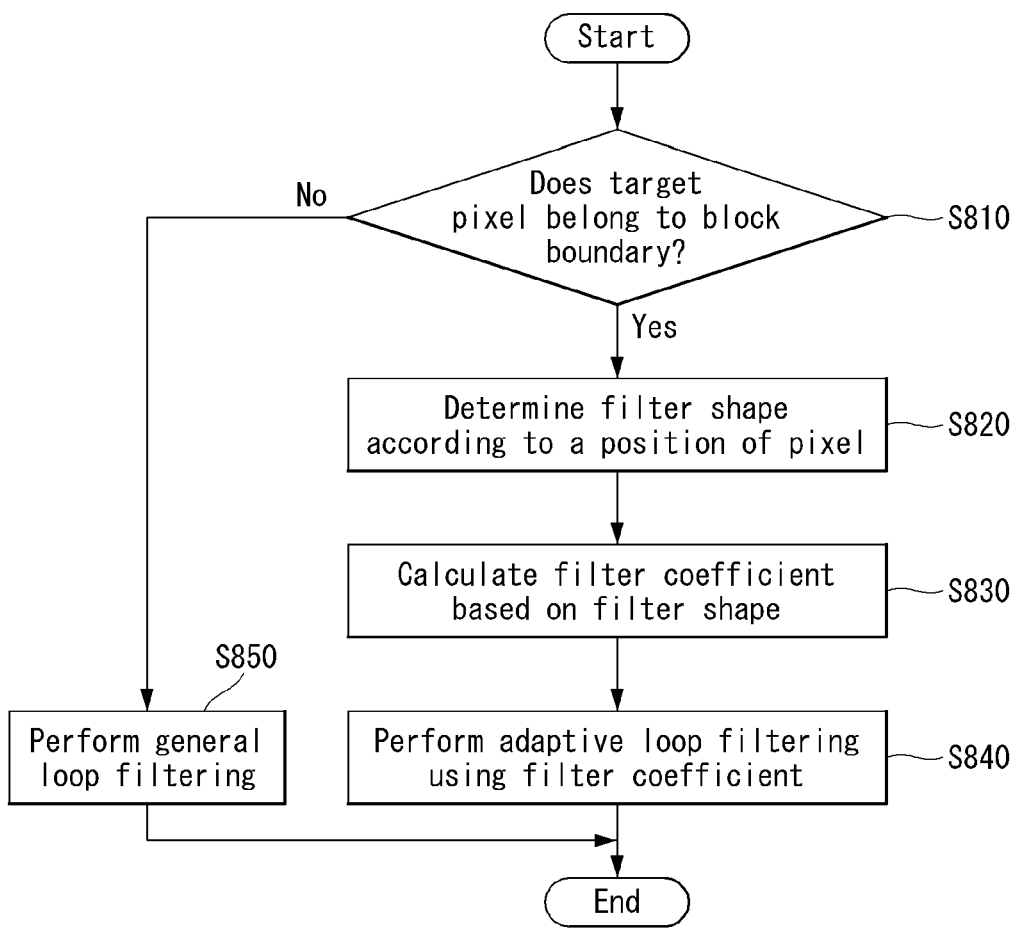

[Figure 9]
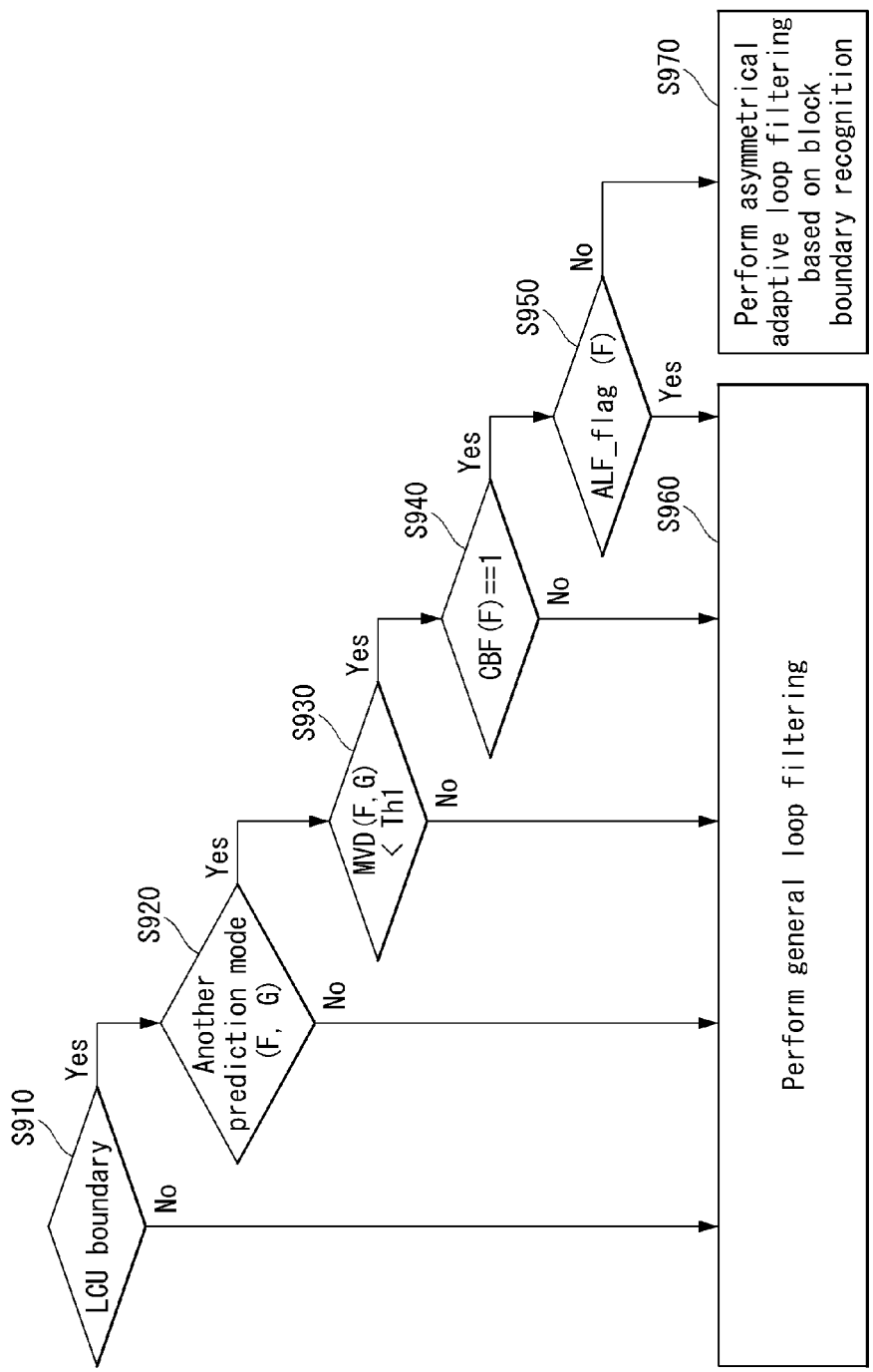

【Figure 10】
(a)
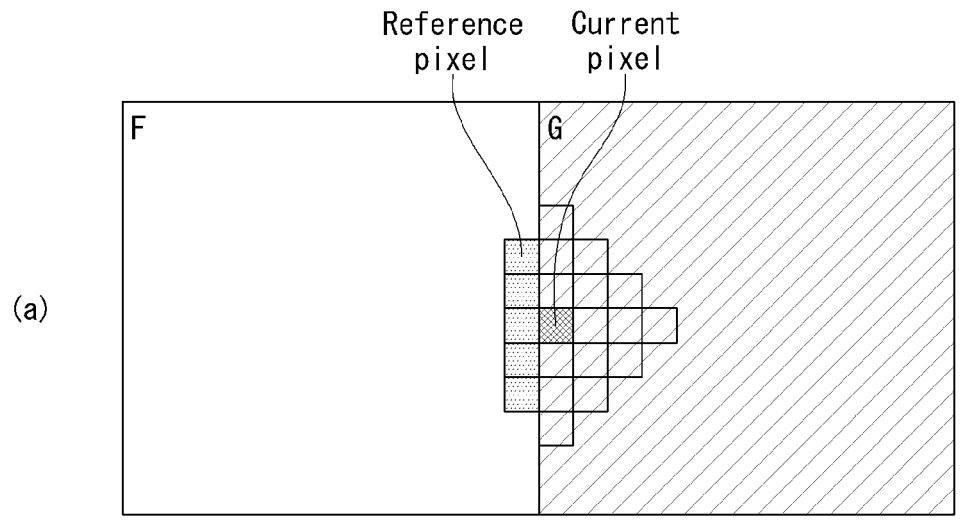
(b)
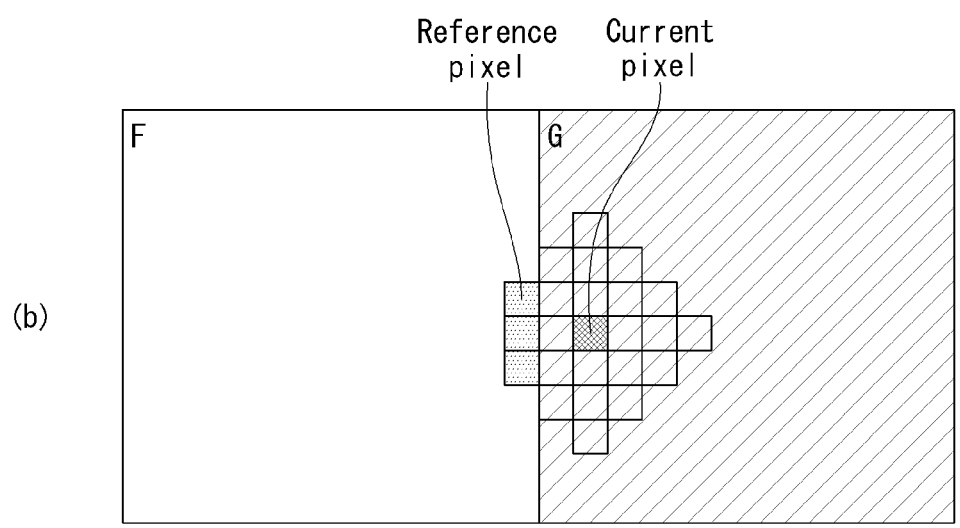

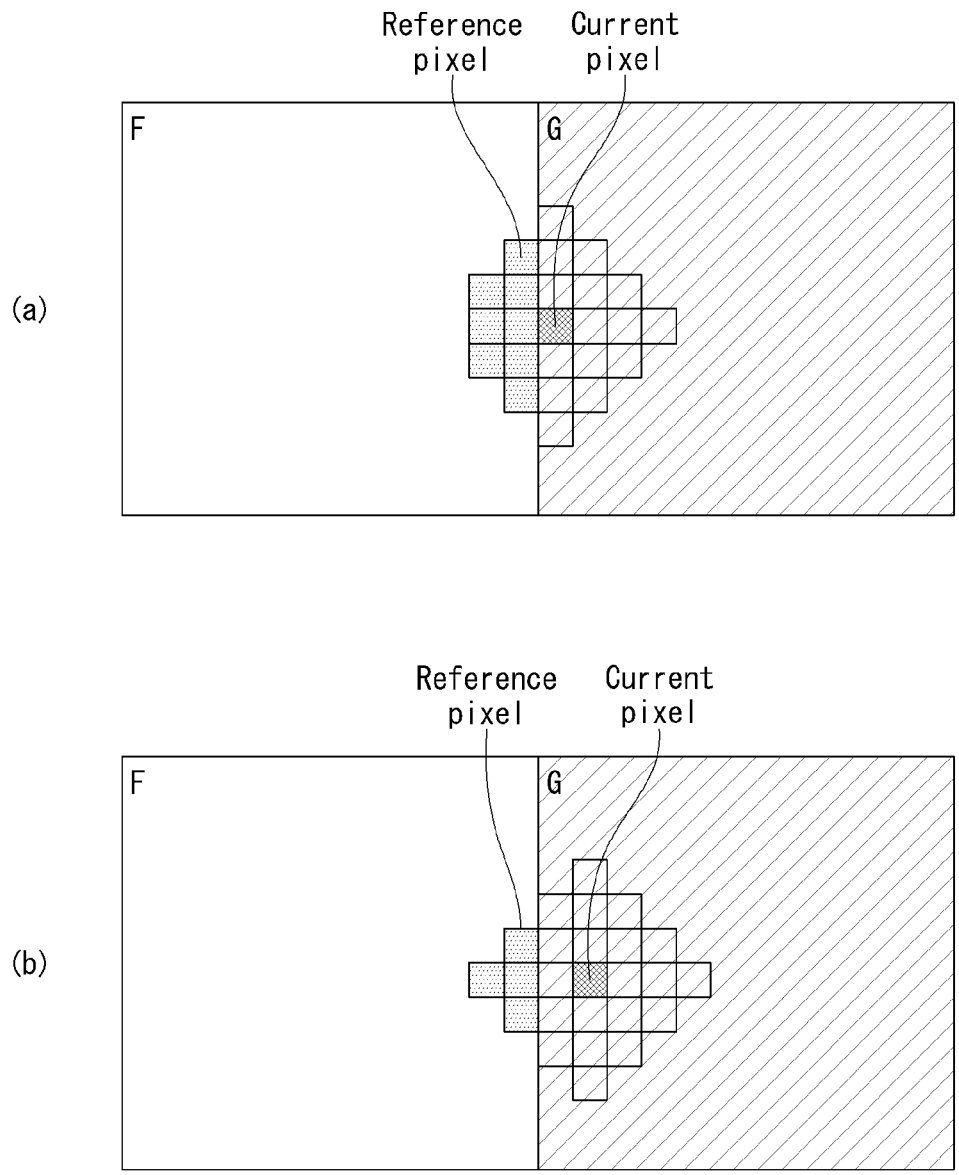
[Figure 11]

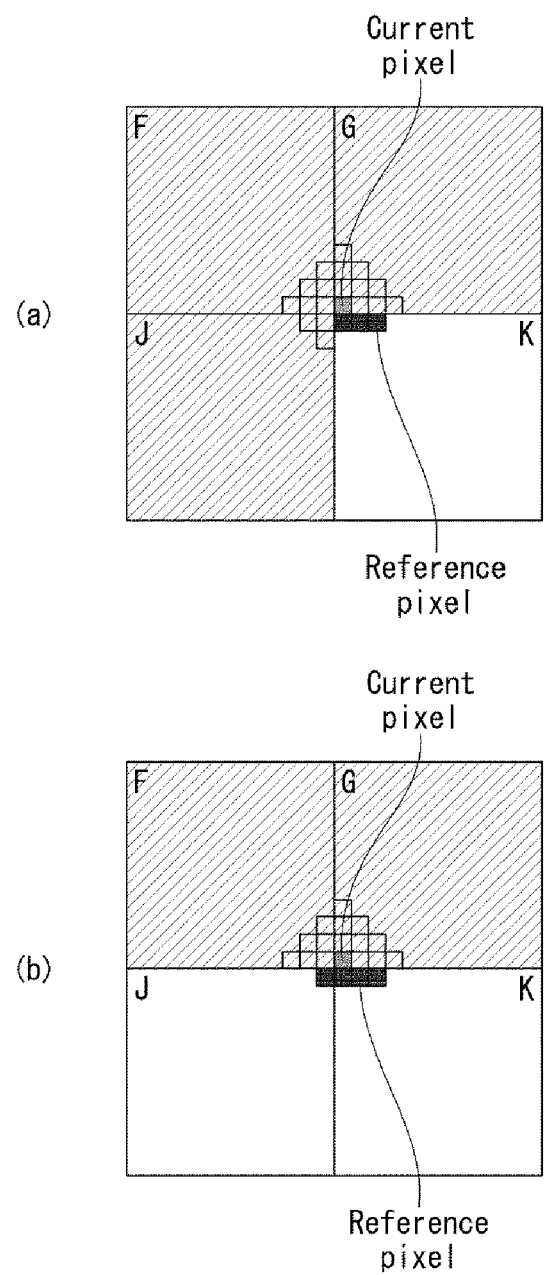
[Figure 12]

METHOD AND DEVICE FOR PERFORMING ADAPTIVE FILTERING ACCORDING TO BLOCK BOUNDARY

CROSS-REFERENCE TO RELATED APPLICATIONS

This application is the National Stage filing under 35 U.S.C. 371 of International Application No. PCT/KR2016/006405, filed on Jun. 16, 2016, which claims the benefit of U.S. Provisional Application No. 62/180,069, filed on Jun. 16, 2015, the contents of which are all hereby incorporated by reference herein in their entirety.

TECHNICAL FIELD

The present invention relates to a method and apparatus for encoding/decoding a video signal and, more particularly, to a technology for adaptively perform filtering based on a block boundary.

BACKGROUND ART

Compression coding refers to a series of signal processing technologies for transmitting digitalized information through a communication line or storing the digitalized information in a form appropriate for a storage medium. Media such as video, an image, voice, and the like, may be the subject to compression coding, and in particular, a technology for performing compression coding on video is called video compression.

Next-generation video content is expected to feature high spatial resolution, a high frame rate, and high dimensionality of scene representation. The processing of such content will bring about a significant increase in message storage, a memory access rate, and processing power.

Thus, a coding tool for effectively processing next-generation video content is required to be designed.

In particular, it is necessary to improve compression efficiency by reducing an error of loop filtering in a block boundary with respect to video on which video decoding has been completed.

DISCLOSURE

Technical Problem

The present invention is to propose an asymmetrical adaptive loop filtering method based on block boundary recognition of minimizing an error of an adaptive loop filter in a block boundary having a different property.

The present invention is to propose a method of determining a block boundary for an asymmetrical adaptive loop filtering based on boundary recognition.

The present invention is to propose a method of determining a filter shape for an asymmetrical adaptive loop filtering based on boundary recognition.

The present invention is to propose a method of deriving a filter coefficient for an asymmetrical adaptive loop filtering based on boundary recognition.

The present invention is to propose a method of applying an adaptive loop filter for an asymmetrical adaptive loop filtering based on boundary recognition.

Technical Solution

The present invention provides a method of adaptively performing filtering based on a block boundary, including the steps of determining whether a current pixel is included in a block boundary or not; determining a filter shape according to a position of the current pixel if the current pixel is included in a block boundary; obtaining a filter coefficient based on the filter shape; and performing an adaptive loop filtering using the filter coefficient.

Furthermore, the present invention further includes the step of checking whether at least one another condition related to a block property is satisfied or not, wherein the adaptive loop filtering is performed if the at least one another condition is satisfied.

Furthermore, in the present invention, the at least one another condition related to the block property indicates whether prediction modes for blocks are different or not.

Furthermore, in the present invention, the at least one another condition related to the block property indicates whether a difference between motion vectors of blocks is smaller than a predetermined threshold.

Furthermore, in the present invention, the at least one another condition related to the block property indicates whether a residual signal is present in a neighbor block.

Furthermore, in the present invention, the at least one another condition related to the block property indicates whether the adaptive loop filtering is not applied.

Furthermore, in the present invention, the filter shape is determined by reference pixels which are limitedly used, and the reference pixels are changed depending on the position of the current pixel.

Furthermore, in the present invention, the reference pixels which are limitedly used are determined in a column unit neighboring the block boundary.

Furthermore, in the present invention, the reference pixels which are limitedly used are determined in proportion to a position where the current pixel is distant from the block boundary.

Furthermore, in the present invention, the filter shape is derived from a method being predefined in a decoder or is determined based on information about a filter shape being received from an encoder.

Furthermore, in the present invention, the filter coefficient is obtained by using a scaling coefficient corresponding to the filter shape.

Furthermore, the present invention provides an apparatus for adaptively performing filtering based on a block boundary, including a block boundary determination unit configured to determine whether a current pixel is included in a block boundary or not; a filter shape determination unit configured to determine a filter shape according to a position of the current pixel if the current pixel is included in a block boundary; a filter coefficient calculation unit configured to obtain a filter coefficient based on the filter shape; and a filtering execution unit configured to perform an adaptive loop filtering using the filter coefficient.

Furthermore, in the present invention, the block boundary determination unit checks whether at least one another condition related to a block property is satisfied or not, and the adaptive loop filtering is performed if the at least one another condition is satisfied.

Furthermore, in the present invention, the at least one another condition related to the block property includes at least one of whether prediction modes for blocks are different or not, whether a difference between motion vectors of blocks is smaller than a predetermined threshold, whether a residual signal is present in a neighbor block, and whether the adaptive loop filtering is not applied.

Advantageous Effects

The present invention can solve a problem in that performance is deteriorated in a block boundary and improve picture quality of a reconstructed image when an adaptive loop filter is used.

Furthermore, the present invention can reduce an error of loop filtering in a block boundary by applying the asymmetrical adaptive loop filtering based on block boundary recognition to video on which video decoding has been completed, and can improve compression efficiency.

DESCRIPTION OF DRAWINGS

FIG. 1 is a schematic block diagram of an encoder encoding a video signal according to an embodiment to which the present disclosure is applied.

FIG. 2 is a schematic block diagram of a decoder decoding a video signal according to an embodiment to which the present disclosure is applied.

FIG. 3 is a schematic internal block diagram of an in-loop filtering unit according to an embodiment to which the present disclosure is applied.

FIG. 4 shows a schematic block diagram of an adaptive loop filtering unit as an embodiment to which the present invention is applied.

FIG. 5 is a diagram for illustrating the split structure of a coding unit as an embodiment to which the present invention is applied.

FIG. 6 is a diagram for illustrating an example in which an adaptive loop filter (ALF) is applied in a block unit as an embodiment to which the present invention is applied.

FIG. 7 is a diagram for illustrating the ALF applied in a block boundary as an embodiment to which the present invention is applied.

FIG. 8 shows a flowchart of performing an asymmetrical adaptive loop filtering based on block boundary recognition as an embodiment to which the present invention is applied.

FIG. 9 shows a flowchart of determining a block boundary as an embodiment to which the present invention is applied.

FIGS. 10 to 12 are embodiments to which the present invention is applied and show filter shapes for applying an asymmetrical adaptive loop filtering based on block boundary recognition.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process. And, partitioning, decomposition, splitting, and division may be properly replaced and interpreted in each coding process.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, an inverse quantization unit 140, an inverse transform unit 150, an in-loop filtering unit 160, a decoded picture buffer (DPB) 170, a prediction unit 180, and an entropy-encoding unit 190. The prediction unit 180 may include an inter-prediction unit 181 and an intra-prediction unit 185.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" or "target unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 181 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 181 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The in-loop filtering unit 160 applies filtering to a reconstructed signal and outputs it to a reproducing device or transmits it to the decoded picture buffer 170. That is, the in-loop filtering unit 160 may perform a filtering process for minimizing the difference between an original image and a reconstructed image.

A filtered signal transmitted to the decoded picture buffer 170 may be transmitted to the prediction filtering unit (not shown) and re-filtered to improve prediction performance. The prediction filtering unit may perform a filtering process for minimizing the difference between an original image and a reference image. For example, the prediction filtering unit may perform filtering using a Wiener filter.

The signal stored in the decoded picture buffer 170 may be transmitted to the prediction unit 180 and may be used to generate a prediction signal. For example, the filtered signal may be used as a reference picture in the inter-prediction unit 181. Coding efficiency can be improved because a filtered picture is used as a reference picture in the inter-frame prediction mode as described above. Meanwhile, the prediction filtering unit may be shown as a unit separated from the prediction unit 180 or may be located within the prediction unit 180 or may be configured along with a different unit.

The decoded picture buffer 170 may store an in-loop filtered picture or prediction filtered picture to store them as a reference picture in the inter-prediction unit 181.

The inter-prediction unit 181 performs temporal prediction and/or spatial prediction to eliminate temporal redundancy and/or spatial redundancy by referring to a reconstructed picture or a picture filtered through the prediction filtering unit 175. In this case, the reference picture used for performing prediction is a transformed signal that has passed through quantization and inverse quantization for each block previously at the time of coding/decoding, so blocking artifacts or ringing artifacts may exist.

Accordingly, in order to solve performance degradation caused by such signal discontinuity or quantization, the inter-prediction unit 181 may interpolate an inter-pixel signal for each subpixel by using a lowpass filter. In this case, a subpixel refers to a virtual pixel generated using an interpolation filter, and an integer pixel refers to an actual pixel that exists in a reconstructed picture. Methods of interpolation may include linear interpolation, a bi-linear interpolation, Wiener filter, etc.

The interpolation filter may be used for a reconstructed picture to improve prediction accuracy. For example, the inter-prediction unit 181 may generate an interpolated pixel by applying the interpolation filter to an integer pixel, and may perform prediction by using an interpolated block consisting of interpolated pixels as a prediction block.

The intra-prediction unit 185 may predict the current block by referring to samples adjacent to a block for which coding is currently to be performed. The intra-prediction unit 185 may perform the following process in order to perform intra-prediction. First, a reference sample required to generate a prediction signal may be prepared. Then, a prediction signal may be generated using the prepared reference sample. Afterwards, prediction modes are coded. In this instance, the reference sample may be prepared through reference sample padding and/or reference sample filtering. The reference sample may have a quantization error since it has undergone prediction and reconstruction processes. Accordingly, in order to reduce such errors, a reference sample filtering process may be performed for each prediction mode used for intra-prediction.

The prediction signal generated by the inter-prediction unit 181 or the intra-prediction unit 185 may be used to generate a reconstruction signal or a residual signal.

FIG. 2 shows a schematic block diagram of a decoder for decoding a video signal, in accordance with one embodiment of the present invention.

Referring to FIG. 2, the decoder 200 may include an entropy decoding unit 210, an inverse quantization unit 220, an inverse transform unit 230, an in-loop filtering unit 240, a decoded picture buffer (DPB) 250, and a prediction unit 260. The prediction unit 260 may include an inter-prediction unit 261 and an intra-prediction unit 265.

A reconstructed video signal output from the decoder 200 may be played using a playback device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The in-loop filtering unit 240 may perform filtering using a filter parameter, and a filtered reconstruction signal may be output to a reproducing device or stored in the decoded picture buffer 250. That is, the in-loop filtering unit 240 may perform a filtering process for minimizing the difference between an original image and a reconstructed image. In this case, the filter parameter may be transmitted from the encoder, or may be derived from other coding information.

A filtered signal transmitted to the decoded picture buffer 250 may be transmitted to the prediction filtering unit (not shown) and re-filtered to improve prediction performance. The prediction filtering unit may perform a filtering process for minimizing the difference between an original image and a reference image. For example, the prediction filtering unit may perform filtering using a Wiener filter.

The filtered signal may be transmitted to the prediction unit 260 and used to generate a prediction signal. For example, the signal filtered through the prediction filtering unit 255 may be used as a reference picture in the inter-prediction unit 261. Coding efficiency can be improved because a filtered picture is used as a reference picture in the inter-frame prediction mode as described above.

The decoded picture buffer 250 may store an in-loop filtered picture or prediction filtered picture to store them as a reference picture in the inter-prediction unit 261.

In this specification, the exemplary embodiments explained with respect to the in-loop filtering unit 160, inter-prediction unit 181, and intra-prediction unit 185 of the encoder 100 may equally apply to the in-loop filtering unit 240, inter-prediction unit 261, and intra-prediction unit 265 of the decoder 200.

FIG. 3 is a schematic internal block diagram of an in-loop filtering unit according to an embodiment to which the present disclosure is applied.

The in-loop filtering unit may include at least one of a deblocking filtering unit 310, an adaptive offset filtering unit 320, and an adaptive loop filtering unit 330.

The in-loop filtering unit may apply filtering to a reconstructed picture and output it to a reproducing device or store it in a buffer to use it as a reference picture in an inter-prediction mode.

The deblocking filtering unit 310 may perform a function of improving distortion occurring at a boundary of a reconstructed picture. For example, it may improve blocking deterioration occurring at a boundary of a prediction unit or transform unit.

First, the deblocking filtering unit 310 may check for a discontinuity in reconstructed pixel values at block boundaries, and if blocking deterioration occurs, it may perform deblocking filtering at the corresponding edge boundary. For example, it is determined whether the block boundary is an 8×8 block boundary and at the same time a boundary of a prediction unit or transform unit, and the boundary strength (BS) value may be calculated based on the determination. Whether to perform filtering or not may be determined based on the boundary strength (BS) value. In this case, a filter parameter may be used as well.

The adaptive offset filtering unit 320 may perform a function for minimizing an error between the reconstructed image and the original image by adding an offset to the reconstructed pixel. In this case, the reconstructed image may mean a deblocking filtered video. The encoder may calculate an offset parameter for correcting an error between a reconstructed image and the original image and transmit the offset parameter to the decoder. The decoder may entropy-decode the transmitted offset parameter and perform filtering in a pixel unit based on the offset parameter.

The adaptive loop filtering unit 333 may obtain an optimal coefficient that minimizes an error between the original image and a reconstructed image, and may perform filtering. The encoder may derive a filter coefficient that minimizes an error between the original image and the reconstructed image, and may transmit information about whether adaptive loop filtering has been adaptively applied to each block and the filter coefficient to the decoder. The decoder may perform filtering based on the transmitted information about whether adaptive loop filtering has been applied or not and the filter coefficient.

In an embodiment of the present invention, the adaptive loop filtering unit 333 provides an asymmetrical adaptive loop filtering method based on block boundary recognition of minimizing an error of an adaptive loop filter in a block boundary having a different property.

In an embodiment of the present invention, the adaptive loop filtering unit 333 provides a method of determining a block boundary for an asymmetrical adaptive loop filtering based on block boundary recognition.

An embodiment of the present invention provides a method of determining a filter shape for an asymmetrical adaptive loop filtering based on block boundary recognition.

An embodiment of the present invention provides a method of deriving a filter coefficient for an asymmetrical adaptive loop filtering based on block boundary recognition.

FIG. 4 shows a schematic block diagram of the adaptive loop filtering unit as an embodiment to which the present invention is applied.

The adaptive loop filtering unit 333 may include at least one of a block boundary determination unit 331, a filter shape determination unit 332, a filter coefficient calculation unit 333 and a filtering execution unit 334.

The block boundary determination unit 331 determines whether a target pixel to which an adaptive loop filter is to be applied belongs to a block boundary. For example, if it is determined that the position of the target pixel to be now filtered is a block boundary, filtering embodiments to which the present invention is applied may be applied. In contrast, if the position of the target pixel to be now filtered is not a block boundary, the general loop filtering method may be applied.

If it is determined that the position of the target pixel to be now filtered is a block boundary, the filter shape determination unit 332 may determine a filter shape. For example, the filter shape determination unit 332 may determine a filter shape based on the position of the target pixel. In this case, the filter shape may be different depending on the position of the target pixel. Furthermore, the filter shape may be derived from a method being predefined in a decoder, or may be determined based on information about a filter shape being received from an encoder.

The filter coefficient calculation unit 333 may obtain a filter coefficient based on a shape determined by the filter shape determination unit 332.

The filtering execution unit 334 may perform filtering based on at least one of the filter shape and the filter coefficient.

FIG. 5 is a view illustrating a partition structure of a coding unit according to an embodiment to which the present disclosure is applied.

An encoder may partition an image (or picture) by rectangular coding tree units (CTUs). Also, the encoder sequentially encodes the CTUs one after another in raster scan order.

For example, a size of the CTU may be determined to any one of 64×64, 32×32, and 16×16, but the present disclosure is not limited thereto. The encoder may selectively use a size of the CTU depending on resolution or characteristics of an input image. The CTU may include a coding tree block (CTB) regarding a luma component and a CTB regarding two chroma components corresponding thereto.

One CTU may be decomposed into a quadtree (QT) structure. For example, one CTU may be partitioned into four equal-sized square units and having each side whose length is halved each time. Decomposition according to the QT structure may be performed recursively.

Referring to FIG. 5, a root node of the QT may be related to the CTU. The QT may be divided until it reaches a leaf node, and here, the leaf node may be termed a coding unit (CU).

The CU may be a basic unit for coding based on which processing an input image, for example, intra/inter prediction is carried out. The CU may include a coding block (CB) regarding a luma component and a CB regarding two chroma components corresponding thereto. For example, a size of the CU may be determined to any one of 64×64, 32×32, 16×16, and 8×8, but the present disclosure is not limited thereto and the size of the CPU may be increased or diversified in the case of a high definition image.

Referring to FIG. 5, the CTU corresponds to a root node and has a smallest depth (i.e., level 0). The CTU may not be divided depending on characteristics of an input image and, in this case, the CTU corresponds to a CU.

The CTU may be decomposed into a QT form and, as a result, lower nodes having a depth of level 1 may be generated. A node (i.e., a leaf node) which is not partitioned any further, among the lower nodes having the depth of level 1, corresponds to a CU. For example, in FIG. 5(*b*), CU(a), CU(b), and CU(j) respectively corresponding to nodes a, b, and j have been once partitioned and have the depth of level 1.

At least one of the nodes having the depth of level 1 may be divided again into the QT form. Also, a node (i.e., a leaf node) which is not divided any further among the lower nodes having a depth of level 2 corresponds to a CU. For example, in FIG. 5(b), CU(c), CU(h), and CU(i) respectively corresponding to nodes c, h, and l have been divided twice and have the depth of level 2.

Also, at least one of the nodes having the depth of level 2 may be divided again in the QT form. Also, a node (leaf node) which is not divided any further among the lower nodes having a depth of level 3 corresponds to a CU. For example, in FIG. 5(b), CU(d), CU(e), CU(f), and CU(g) respectively corresponding to nodes d, e, f, and g have been divided three times and have the depth of level 3.

In the encoder, a largest size or a smallest size of a CPU may be determined according to characteristics (e.g., resolution) of a video image or in consideration of efficiency of coding. Also, information regarding the determined largest size or smallest size of the CU or information deriving the same may be included in a bit stream. A CPU having a largest size may be termed a largest coding unit (LCU) and a CU having a smallest size may be termed a smallest coding unit (SCU).

Also, the CU having a tree structure may be hierarchically divided with predetermined largest depth information (or largest level information). Also, each of the divided CUs may have depth information. Since the depth information represents the number by which a CU has been divided and/or a degree to which the CU has been divided, the depth information may include information regarding a size of the CU.

Since the LCU is divided into the QT form, a size of the SCU may be obtained using a size of the LCU and largest depth information. Or, conversely, a size of the LCU may be obtained using the size of the SCU and largest depth information of a tree.

Regarding one CU, information representing whether the corresponding CU is partitioned may be delivered to the decoder. For example, the information may be defined as a split flag and represented by a syntax element "split cu flag". The split flag may be included in every CU except for the SCU. For example, if the value of the split flag is '1', the corresponding CU is partitioned again into four CUs, while if the split flag is '0', the corresponding CU is not partitioned further, but a coding process with respect to the corresponding CU may be carried out.

Although the embodiment of FIG. 5 has been described with respect to a partitioning process of a CU, the QT structure may also be applied to the transform unit (TU) which is a basic unit carrying out transformation.

A TU may be partitioned hierarchically into a quadtree structure from a CU to be coded. For example, the CU may correspond to a root node of a tree for the TU.

Since the TU may be partitioned into a QT structure, the TU partitioned from the CU may be partitioned into smaller TUs. For example, the size of the TU may be determined by any one of 32×32, 16×16, 8×8, and 4×4. However, the present invention is not limited thereto and, in the case of a high definition image, the TU size may be larger or diversified.

For each TU, information regarding whether the corresponding TU is partitioned may be delivered to the decoder. For example, the information may be defined as a split transform flag and represented as a syntax element "split_transform_flag".

The split transform flag may be included in all of the TUs except for a TU having a smallest size. For example, when the value of the split transform flag is '1', the corresponding CU is partitioned again into four TUs, and when the split transform flag is '0', the corresponding TU is not partitioned further.

As described above, a CU is a basic coding unit, based on which intra- or inter-prediction is carried out. In order to more effectively code an input image, a CU can be decomposed into prediction units (PUs).

A PU is a basic unit for generating a prediction block; prediction blocks may be generated differently in units of PUs even within one CU. A PU may be partitioned differently according to whether an intra-prediction mode or an inter-prediction mode is used as a coding mode of the CU to which the PU belongs.

FIG. 6 is a diagram for illustrating an example in which an adaptive loop filter (ALF) is applied in a block unit as an embodiment to which the present invention is applied.

The adaptive loop filter to which the present invention is applied is a technology for filtering a reconstructed image on which decoding has been completed using a filter coefficient received from the encoder. The filter coefficient transmitted by the encoder obtains a filter coefficient that minimizes an error between a reconstructed image and the original image in a picture unit. The filter coefficient may have an integer form or a real number form and may transmit N filters of an M×1 or M×M shape.

Furthermore, in an embodiment of the present invention, the adaptive loop filter may determine whether it will be applied or not in the largest coding unit (LCU) or a coding unit (CU) unit.

FIG. 6 shows an example in which an ALF on or an ALF off is applied in a block unit. For example, blocks A, C, G, H, i, J and L show that the adaptive loop filter is applied, and blocks B, D, E, F and K show that the adaptive loop filter is not applied.

In this case, blocks to which the adaptive loop filter is applied and blocks to which the adaptive loop filter is not applied, such as the blocks A and B and the blocks F and G, may have different properties. If a block to which the adaptive loop filter is applied performs filtering, filtering performance may be deteriorated if it uses the pixels of a neighbor block to which the adaptive loop filter is not applied. For example, filtering performance may be deteriorated if the block G performs filtering using the pixels of the block F.

Accordingly, the present invention provides a method of minimizing an error of adaptive loop filtering in a block boundary.

FIG. 7 is a diagram for illustrating the ALF applied in a block boundary as an embodiment to which the present invention is applied.

An embodiment of the present invention provides a method of performing adaptive loop filtering if a block to which the adaptive loop filter is applied and a block to which the adaptive loop filter is not applied neighbor each other.

FIG. 7 shows an example in which the ALF of a 7×7 size is applied in a block boundary. A block F is an ALF off block, and a block G is an ALF on block. A current pixel (dark deviant crease line) in a G block boundary performs filtering using pixels around the current pixel, including the reference pixels (dotted line) of the block F.

However, since the blocks F and G may have different properties as described above, filtering performance may be deteriorated if the reference pixels of the neighbor block F are used when adaptive loop filtering is performed on the block F.

Accordingly, the present invention provides a method of performing asymmetrical adaptive loop filtering based on a block boundary.

FIG. 8 shows a flowchart of performing an asymmetrical adaptive loop filtering based on block boundary recognition as an embodiment to which the present invention is applied.

An embodiment of the present invention provides an asymmetrical adaptive loop filtering process based on block boundary recognition. The present invention may basically include a block boundary determination step, a filter shape determination step, a filter coefficient acquisition step and a filtering execution step. The present embodiment may be performed in the adaptive loop filtering unit within the encoder or the decoder.

First, the adaptive loop filtering unit may check whether a target pixel to be filtered is included in a block boundary (S810). In this case, the block boundary may correspond to any one of a picture boundary, an LCU boundary, a CU boundary, a TU boundary and a PU boundary.

In another embodiment, the adaptive loop filtering unit may determine whether or not to perform an asymmetrical adaptive loop filtering based on block boundary recognition to which the present invention is applied by checking other conditions. In this case, the asymmetrical adaptive loop filtering based on block boundary recognition means that the adaptive loop filter is asymmetrically applied in a block boundary.

For example, the adaptive loop filtering unit may perform an asymmetrical adaptive loop filtering based on block boundary recognition to which the present invention is applied if the other conditions are satisfied although a target pixel to be filtered is included in a block boundary.

In this case, the other conditions may include the property of a block or unit. For example, the other conditions may include a prediction mode, a difference between the motion vectors of blocks, whether a residual signal is present, and whether the ALF has been applied or not.

In another embodiment, the adaptive loop filtering unit may perform an asymmetrical adaptive loop filtering based on block boundary recognition, depending on flag information indicating whether or not to perform the asymmetrical adaptive loop filtering based on block boundary recognition.

If the target pixel is included in a block boundary or it is determined that the asymmetrical adaptive loop filtering based on block boundary recognition is performed according to the other conditions as described above, the adaptive loop filtering unit may determine a filter shape based on the position of the target pixel (S820).

For example, if the target pixel is included in a block boundary, the reference pixels of a neighbor block may be limitedly used. For detailed example, only the pixels of the first column from among the reference pixels of the neighbor block may be used.

For another example, the columns of the reference pixels of a neighbor block, corresponding to the position where a target pixel is distant from a block boundary, may be used. For detailed example, if a target pixel is located in the position of the second pixel in a block boundary, a column up to the second column from among the reference pixels of the neighbor block may be used.

For another example, the filter shape may be derived from a method being predefined in a decoder, or may be determined based on information about a filter shape being received from an encoder.

When the filter shape is determined as described above, the adaptive loop filtering unit may obtain a filter coefficient based on the filter shape (S830).

The adaptive loop filtering unit may perform adaptive loop filtering using the filter coefficient (S840).

Meanwhile, if the target pixel is not included in a block boundary at step S810, the adaptive loop filtering unit may perform filtering according to the general loop filtering method (S850).

For another example, if it is determined that the asymmetrical adaptive loop filtering based on block boundary recognition is not performed based on the other conditions, the adaptive loop filtering unit may perform filtering according to the general loop filtering method.

FIG. 9 shows a flowchart of determining a block boundary as an embodiment to which the present invention is applied.

In an embodiment of the present invention, the adaptive loop filtering unit may check whether a target pixel to be filtered is included in a block boundary. In this case, the block boundary may include at least one of a picture boundary, an LCU boundary, a CU boundary, a TU boundary and a PU boundary.

In another embodiment, the adaptive loop filtering unit may determine whether or not to perform an asymmetrical adaptive loop filtering based on block boundary recognition to which the present invention is applied by checking other conditions. In this case, the other conditions may include the property of a block or unit. For example, the other conditions may include a prediction mode, a difference between the motion vectors of blocks, whether a residual signal is present, and whether the ALF has been applied or not.

Referring to FIG. 9, first, the adaptive loop filtering unit may determine whether a target pixel to be filtered belongs to a block boundary or not (S910). For example, the block boundary may include at least one of a picture boundary, an LCU boundary, a CU boundary, a TU boundary and a PU boundary.

If the target pixel to be filtered is included in a block boundary, the adaptive loop filtering unit may check a prediction mode (S920). For example, the adaptive loop filtering unit may check whether the prediction modes of neighbor blocks are the same or not. For detailed example, the adaptive loop filtering unit may check whether the prediction modes of the block F and the block G in FIG. 7 are the same or not.

If the prediction modes of the neighbor blocks are not the same, the adaptive loop filtering unit may perform an asymmetrical adaptive loop filtering based on block boundary recognition.

Alternatively, the adaptive loop filtering unit may additionally check the other conditions. For example, the adaptive loop filtering unit may check whether a difference between the motion vectors of the blocks is smaller than a preset threshold or not (S930).

If a difference between the motion vectors of blocks is smaller than the preset threshold, the adaptive loop filtering unit may perform an asymmetrical adaptive loop filtering based on block boundary recognition.

Alternatively, the adaptive loop filtering unit may additionally check another condition. For example, the adaptive loop filtering unit may check whether a residual signal is present in the neighbor block or not (S940). For detailed example, the adaptive loop filtering unit may check whether a residual signal is present in the neighbor block F or not by checking whether a CBF(F) is 1.

If a residual signal is present in the neighbor block, the adaptive loop filtering unit may perform an asymmetrical adaptive loop filtering based on block boundary recognition.

Alternatively, the adaptive loop filtering unit may additionally check the other conditions. For example, the adaptive loop filtering unit may check whether the ALF has been applied (S950).

If the ALF has not been applied, the adaptive loop filtering unit may perform an asymmetrical adaptive loop filtering based on block boundary recognition (S970).

In contrast, if the target pixel to be filtered does not belong to a block boundary or the other conditions are not satisfied, the adaptive loop filtering unit may determine that the target pixel to be filtered is not included in a block boundary and thus may perform the general loop filtering (S960).

For example, if the target pixel to be filtered does not belong to a block boundary, the prediction modes of the neighbor blocks are the same, a difference between the motion vectors of blocks is not smaller than the preset threshold, a residual signal is not present in the neighbor block or the ALF has been applied, the adaptive loop filtering unit may perform the general loop filtering.

In FIG. 9, the conditions have been illustrated, but the present invention is not limited thereto. Whether or not to perform an asymmetrical adaptive loop filtering based on block boundary recognition may be determined based on at least one of the conditions.

Furthermore, one of the conditions may be used or a plurality of some of the conditions may be selectively combined and used, the sequence of the conditions may be changed, and another condition including the property of a block may be added.

FIGS. 10 to 12 are embodiments to which the present invention is applied and show filter shapes for applying an asymmetrical adaptive loop filtering based on block boundary recognition.

Referring to FIG. 10, if a target pixel (current pixel) within a block G is included in a block boundary, the pixels of a block F may be limitedly used when the adaptive loop filter is applied. In this case, the block F and the block G may have different block properties.

For example, if the target pixel is included in a block boundary, the reference pixels of a neighbor block may be limited used. For detailed example, referring to FIG. 10(a), only the pixels of the first column from among the reference pixels of a neighbor block may be used.

Furthermore, referring to FIG. 10(b), although a target pixel is located in the second pixel from a block boundary, only the pixels of the first column from among the reference pixels of a neighbor block may be used.

For another example, the columns of the reference pixels of a neighbor block, corresponding to the position where a target pixel is distant from a block boundary, may be used. For detailed example, if a target pixel is located in the second pixel of a block boundary, a column up to the second column of the reference pixels of a neighbor block may be used.

For another example, the filter shape may be derived from a method being predefined in a decoder, or may be determined based on information about a filter shape being received from an encoder.

In the present invention, a filter shape may be changed like FIGS. 10(a) and 10(b) depending on the position of a target pixel. The present invention may be similarly applied in case that a target pixel neighbors a boundary in a horizontal direction.

FIG. 11 is an embodiment of a different filter shape and shows an embodiment in which reference is made to two column pixels of the pixels of a block F.

Referring to FIG. 11(a), if a target pixel is included in a block boundary, in the present invention, two column pixels of the reference pixels of a neighbor block may be used.

Furthermore, referring to FIG. 11(b), in the present invention, two column pixels of the reference pixels of a neighbor block, corresponding to the position where a target pixel is distant from a block boundary, may be used.

A filter shape may be changed like FIGS. 11(a) and 11(b) depending on the position of a target pixel. In this case, FIG. 11(b) is the same as the general adaptive loop filter and may be processed using the same method as the filtering of pixels not including a block boundary.

However, if a filter tap is greater than that of the embodiment of FIG. 11, the corresponding filter shape may be changed. If a corresponding pixel neighboring a boundary in the horizontal direction, the present invention may be similarly applied.

As in FIGS. 10 and 11, in the present invention, information about a method of referring the pixels of a neighbor block may be transmitted to the decoder and information may not be transmitted if the encoder/the decoder use the same method.

FIG. 12 shows an embodiment of a filter shape if a plurality of neighbor blocks is referred.

FIG. 12 (a) shows a case where a target pixel within a block G is not included in the block boundary of a block F and block J, that is, left blocks and a block K is included in a block boundary.

In an embodiment of the present invention, if a target pixel is not included in a block boundary, filtering may be applied using all of pixels of neighbor blocks (block F and block J). In contrast, if a target pixel is included in a block boundary, the pixels of a neighbor block (block K) may be limitedly used.

FIG. 12(b) shows a case where only a block F, that is, a left block of a target pixel within a block G, is not included in a block boundary and a block J and a block K are included in the block boundary. As in FIG. 12(a), it may be seen that in the case of the block J and the block K included in the block boundary, pixels for filtering are limitedly used.

Meanwhile, in another embodiment to which the present invention is applied, the filter coefficient acquisition step is the step of adjusting a filter coefficient according to a filter shape determined in the filter shape determination step.

If a filter shape is changed in the filter shape determination step, the sum of all of the filter coefficients may not be identical with a scaling value for filtering because the filter coefficient of a corresponding location is changed into 0.

Furthermore, when the encoder obtains the coefficient of the adaptive loop filter, the coefficient has been obtained based on the case where a symmetrical filter shape is normal. Accordingly, when a filter shape is changed, it is necessary to adjust all of scale values by scaling the coefficient.

A filter coefficient acquisition method according to an embodiment of the present invention is shown in Equation 1.

$$f_n(i,j) = \frac{S_{factor}}{\sum\limits_{i,j=-M/2-1}^{M/2}(f(i,j)\otimes MASK(i,j))} \times f(i,j)\otimes MASK(i,j) \qquad [\text{Equation 1}]$$

In this case, $S_{factor}$ means a scaling value for filtering. MASK (i,j) is a mask value indicating whether a filter coefficient is present or not. For example, if the filter coefficient is present, the mask value has a value of 1. If the filter coefficient is not present, the mask value has a value of 0. f(i,j) means the filter coefficient of a normally symmetrical filter shape. $f_n(i,j)$ means a filter coefficient calculated according to the filter coefficient acquisition method proposed by the present invention. In the embodiment, the size of the filter shape may be M×M.

The decoder may separately have an adaptive loop filter coefficient for a pixel including a block boundary and an adaptive loop filter coefficient for a pixel of an internal region not including a block boundary, unlike in the method of calculating a filter coefficient in the filter coefficient derivation step.

As described above, the embodiments explained in the present invention may be implemented and performed on a processor, a micro-processor, a controller or a chip. For example, functional modules explained in FIGS. 1 to 3 and 11 may be implemented and performed on a computer, a processor, a microprocessor, a controller or a chip.

As described above, the decoder and the encoder to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present disclosure is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing filtering adaptively based on a block boundary, the method comprising:
   determining whether a current pixel is included in a block boundary or not;
   determining a filter shape according to a position of the current pixel if the current pixel is included in a block boundary;
   obtaining a filter coefficient based on the filter shape; and
   performing an adaptive loop filtering using the filter coefficient,
   checking whether at least one another condition related to a block property is satisfied or not,
   wherein the adaptive loop filtering is performed if the at least one another condition is satisfied, and
   wherein the at least one another condition related to the block property indicates whether a difference between motion vectors of blocks is smaller than a predetermined threshold.

2. The method of claim 1, wherein the at least one another condition related to the block property indicates whether prediction modes for blocks are different or not.

3. The method of claim 1, wherein the at least one another condition related to the block property indicates whether a residual signal is present in a neighbor block.

4. The method of claim 1, wherein the at least one another condition related to the block property indicates whether the adaptive loop filtering is not applied.

5. The method of claim 1, wherein:
   the filter shape is determined by reference pixels which are limitedly used, and
   the reference pixels are changed depending on the position of the current pixel.

6. The method of claim 5, wherein the reference pixels which are limitedly used are determined in a column unit neighboring the block boundary.

7. The method of claim 5, wherein the reference pixels which are limitedly used are determined in proportion to a position where the current pixel is distant from the block boundary.

8. The method of claim 1, wherein the filter shape is derived from a method being predefined in a decoder or is determined based on information about a filter shape being received from an encoder.

9. The method of claim 1, wherein the filter coefficient is obtained by using a scaling coefficient corresponding to the filter shape.

10. An apparatus for adaptively performing a filtering based on a block boundary, comprising:
    a processor configured to
    determine whether a current pixel is included in a block boundary or not and checks whether at least one another condition related to a block property is satisfied or not;
    determine a filter shape depending on a position of the current pixel if the current pixel is included in a block boundary;
    obtain a filter coefficient based on the filter shape; and
    perform an adaptive loop filtering using the filter coefficient,
    wherein the adaptive loop filtering is performed if the at least one another condition is satisfied, and
    wherein the at least one another condition related to the block property comprises at least one of whether prediction modes for blocks are different or not, whether a difference between motion vectors of blocks is smaller than a predetermined threshold, whether a residual signal is present in a neighbor block, and whether the adaptive loop filtering is not applied.

11. The apparatus of claim 10, wherein the filter shape is determined by reference pixels which are limitedly used, and the reference pixels are changed depending on the position of the current pixel.

* * * * *